(12) United States Patent
Hamada et al.

(10) Patent No.: US 6,194,067 B1
(45) Date of Patent: Feb. 27, 2001

(54) CARBONACEOUS PARTICLES AND CARBONACEOUS FIBERS BOTH COATED WITH BORON NITRIDE, AND LITHIUM SECONDARY CELLS PRODUCED BY USING THE SAME AS NEGATIVE ACTIVE MATERIAL

(75) Inventors: Takeshi Hamada; Tsutomu Sugiura; Kimihito Suzuki; Taro Kohno, all of Kawasaki; Koki Inada, Tokyo; Yoshitaka Yamana, Futtsu, all of (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/254,190
(22) PCT Filed: Jun. 30, 1998
(86) PCT No.: PCT/JP98/02932
§ 371 Date: Feb. 26, 1999
§ 102(e) Date: Feb. 26, 1999
(87) PCT Pub. No.: WO99/00325
PCT Pub. Date: Jan. 7, 1999

(30) Foreign Application Priority Data

Jun. 30, 1997 (JP) .................................................. 9-174470

(51) Int. Cl.[7] .................................................. B32B 9/00
(52) U.S. Cl. .................... 428/367; 428/375; 428/402; 428/403
(58) Field of Search ................................. 428/367, 375, 428/408, 402, 403

(56) References Cited

U.S. PATENT DOCUMENTS

| | | | | |
|---|---|---|---|---|
| 4,944,904 | * | 7/1990 | Singh et al. | 264/60 |
| 5,015,540 | * | 5/1991 | Borom et al. | 428/698 |
| 5,021,367 | * | 6/1991 | Singh et al. | 501/88 |
| 5,449,887 | * | 9/1995 | Holcombe et al. | 219/679 |

FOREIGN PATENT DOCUMENTS

| | | | |
|---|---|---|---|
| 4-333578 | * | 11/1992 | (JP) . |
| 6-187974 | * | 7/1994 | (JP) . |
| 7-89776 | * | 4/1995 | (JP) . |

* cited by examiner

*Primary Examiner*—William Krynski
*Assistant Examiner*—J. M. Gray
(74) *Attorney, Agent, or Firm*—Keynon & Kenyon

(57) ABSTRACT

Carbonaceous particles and carbonaceous fibers whose surfaces are covered with a boron nitride thin film, wherein the atomic concentration of boron C(B), the atomic concentration of carbon C(C) and the atomic concentration of nitrogen C(N) satisfy the following inequalities:

$$0.05 < C(B)/(C(B)+C(C)+C(N)) < 0.3$$

$$0.05 < C(N)/(C(B)+C(C)+C(N)) < 0.3$$

in the surface region as measured by photoelectron spectroscopy. Also, lithium secondary batteries which employ these carbonaceous particles and carbonaceous fibers as negative electrode active materials.

4 Claims, 1 Drawing Sheet

CARBONACEOUS PARTICLES AND CARBONACEOUS FIBERS BOTH COATED WITH BORON NITRIDE, AND LITHIUM SECONDARY CELLS PRODUCED BY USING THE SAME AS NEGATIVE ACTIVE MATERIAL

TECHNICAL FIELD

The present invention relates to novel carbonaceous particles and carbonaceous fibers and to lithium secondary batteries. More specifically, the invention relates to carbonaceous particles and carbonaceous fibers which are covered on their surfaces with boron nitride thin films and are suitable for applications as reinforcing materials, lubricating materials and electronic materials such as lithium secondary battery materials, as well as to lithium secondary batteries which employ them as negative electrode active materials.

BACKGROUND ART

Carbonaceous materials are commonly used as reinforcing materials for plastics, metals and carbon because of their mechanical high strength and high elastic modulus. In addition, because of their high crystallographic and mechanical anisotropy, they are also useful as lubricating materials for sliding parts. Their unique microstructures are also utilized for applications in capacitor batteries and lithium secondary batteries. However, carbonaceous materials have a drawback in that they undergo degradation at temperatures of a few hundred ° C. and above by oxidation in the presence of oxygen and other oxidative gases, or react with the metals or other matrixes to produce carbides, so that their expected performance cannot be exhibited; applications of carbonaceous materials as reinforcing materials and lubricating materials and so on have therefore been limited.

Boron nitride has also been applied as a sliding material, etc. Boron nitride is a chemically stable material with high oxidation resistance, but is difficult in control of its crystallinity and form than carbonaceous materials.

It has been attempted to utilize the similarities and differences between carbonaceous materials and boron nitride to produce materials which are combinations thereof. Japanese Unexamined Patent Publication (Kokai) No. 8-245206, for example, discloses a boron carbonitride material which is an intermediate compound of graphite and boron nitride wherein carbon, nitrogen and boron are in a molar composition of 6:2:1. Also, Japanese Unexamined Patent Publication (Kokai) No. 5-171444 discloses a material with excellent wear resistance comprising a bi-layer film composed of a hard carbon film and a boron nitride film which is formed on a coated substrate by vapor phase synthesis. Japanese Unexamined Patent Publication (Kokai) No. 7-187883 discloses a process for coating a silicon substrate with a thin film of boron nitride alloyed with carbon, which can be employed for wear resistant uses and for semiconductors across a wide range of temperatures. The processes for forming these boron nitride films involve vapor phase reaction under reduced pressure, but while such processes are effective for producing films on flat surfaces, they are difficult for materials with not flat surfaces, such as carbonaceous particles and carbonaceous fibers.

Carbonaceous particles and carbonaceous fibers containing boron atoms and nitrogen atoms are disclosed in Japanese Unexamined Patent Publication (Kokai) No. 3-245458, No. 5-266880, No. 5-290843, No. 8-306359 and No. 8-31422. These carbonaceous particles and carbonaceous fibers, however, have the boron atoms or nitrogen atoms in solid solution in the carbon, or have carbon atoms replaced with boron atoms or nitrogen atoms, or are stoichiometrically simple compounds of carbon, nitrogen and boron.

Graphite is also used as a negative electrode active material in lithium secondary batteries, and Japanese Unexamined Patent Publication (Kokai) No. 9-63584 discloses the use of a carbon material which has been subjected to graphite treatment in the presence of a boron compound as a negative electrode active material in a lithium secondary battery, in order to achieve increased activity for the negative electrode active material. However, graphitization treatments in the presence of a boron compound it does not make possible to obtain a graphite material coated with boron nitride, and no improvement in chemical stability is achieved.

It is an object of the present invention to modify the chemically unstable surfaces of conventional carbonaceous particles and carbonaceous fibers by coating them with a boron nitride thin film, to thus provide carbonaceous particles and carbonaceous fibers with a widened range of applications.

It is another object of the invention to provide lithium secondary batteries with improved chemical stability of their negative electrode active materials by using the aforementioned boron nitride thin film-coated carbonaceous particles and carbonaceous fibers as the negative electrode active materials.

DISCLOSURE OF THE INVENTION

The present inventors have carried out diligent research in the light of reaction theory relating to different boron compounds and starting carbonaceous materials under various types of heat treatment conditions, such as that of the atmosphere gas, with the aim of modifying the surfaces of carbonaceous particles and carbonaceous fibers into a more chemically stable form. As a result, the present inventors have found that by addition of an appropriate amount of a boron compound as a graphitizing catalyst, sealing the mixture in a crucible, raising the temperature of the crucible to above a given temperature in an atmosphere of an inert gas containing an appropriate amount of nitrogen gas or a reducing gas containing an appropriate amount of nitrogen gas, and then lowering the temperature at a slow rate after holding it for a prescribed time or immediately without holding it, the resulting carbonaceous particles or carbonaceous fibers have a unique structure wherein the surfaces are covered with a chemically stable boron nitride thin film. It was also found that by using the carbonaceous particles and carbonaceous fibers covered with the chemically stable boron nitride thin film as negative electrode active materials in lithium secondary batteries, it is possible to provide excellent secondary battery characteristics as well as improved chemical stability for the lithium secondary batteries. The present invention has been completed on the basis of these findings.

In other words, the present invention provides the following.

(1) Carbonaceous particles characterized in that the surfaces of the carbonaceous particles are coated with a boron nitride thin film, wherein the atomic concentration of boron C(B), the atomic concentration of carbon C(C) and the atomic concentration of nitrogen C(N) satisfy the following inequalities:

$$0.05 < C(B)/(C(B)+C(C)+C(N)) < 0.3$$

$$0.05 < C(N)/(C(B)+C(C)+C(N)) < 0.3$$

in the surface region as measured by photoelectron spectroscopy;

(2) Carbonaceous fibers characterized in that the surface of the carbonaceous fibers are coated with a boron nitride thin film, wherein the atomic concentration of boron C(B), the atomic concentration of carbon C(C) and the atomic concentration of nitrogen C(N) satisfy the following inequalities:

$$0.05 < C(B)/(C(B)+C(C)+C(N)) < 0.3$$

$$0.05 < C(N)/(C(B)+C(C)+C(N)) < 0.3$$

in the surface region as measured by photoelectron spectroscopy;

(3) Carbonaceous particles or carbonaceous fibers according to (1) and (2) above, wherein the 002 plane spacing ($d_{002}$) as determined by X-ray diffraction is 0.337 nm or less;

(4) A lithium secondary battery which employs a reversible charge/discharge material as the positive electrode active material, a lithium ion-containing nonaqueous electrolyte, a separator which is permeable to lithium ions, and a carbonaceous material as the negative electrode active material, characterized in that the lithium secondary battery uses the carbonaceous particles according to (1) above or carbonaceous fibers according to (2) above as the negative electrode active material;

(5) A lithium secondary battery which employs a reversible charge/discharge material as the positive electrode active material, a lithium ion-containing nonaqueous electrolyte, a separator which is permeable to lithium ions, and a carbonaceous material as the negative electrode active material, characterized in that the lithium secondary battery uses carbonaceous fibers according to (2) above as the negative electrode active material;

(6) A lithium secondary battery which employs a reversible charge/discharge material as the positive electrode active material, a lithium ion-containing nonaqueous electrolyte, a separator which is permeable to lithium ions, and a carbonaceous material as the negative electrode active material, characterized in that the lithium secondary battery carbonaceous particles or carbonaceous fibers according to (3) above as the negative electrode active material.

BEST MODE FOR CARRYING OUT THE INVENTION

Figure 1:
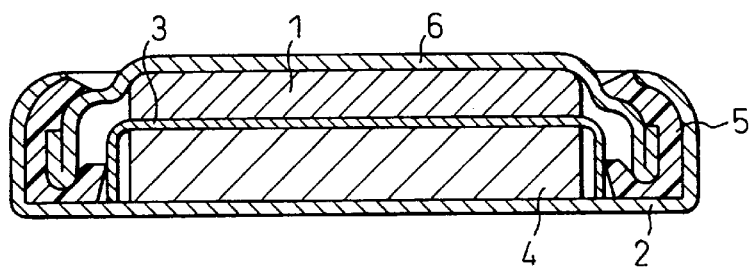
FIG. 1 is a cross-sectional view of a lithium secondary battery.

The subject matter of the present invention will now be explained in detail.

The surfaces of the carbonaceous particles and carbonaceous fibers of the invention are covered with a boron nitride thin film, and since the surfaces of the carbonaceous particles and carbonaceous fibers are thus chemically stabilized without sacrificing the excellent performance of the substrate, a wider range of applications is available.

The surfaces of the carbonaceous particles and carbonaceous fibers of the invention are covered with a boron nitride thin film, and the fact that the thin film covering the surfaces is made of boron nitride can be confirmed by determining that the 1s orbital-originating peak position for nitrogen and the 1s orbital-originating peak position for boron as measured by photoelectron spectroscopy match the respective peak positions measured for boron nitride alone, and by determining that the ratio of the atomic concentration of nitrogen and atomic concentration of boron is almost 1:1 as calculated from the peak areas.

The carbonaceous particles and carbonaceous fibers of the invention have a atomic concentration of boron C(B), atomic concentration of carbon C(C) and atomic concentration of nitrogen C(N) which satisfy the following inequalities:

$$0.05 < C(B)/(C(B)+C(C)+C(N)) < 0.3$$

$$0.05 < C(N)/(C(B)+C(C)+C(N)) < 0.3$$

in the surface region as measured by photoelectron spectroscopy, which indicates that the (entire) surfaces of the carbonaceous particles or carbonaceous fibers are satisfactorily covered with the boron nitride thin film, and that virtually no fusion has occurred between the carbonaceous particles or carbonaceous fibers after heat treatment, so that they can be effectively used as sliding materials, reinforcing materials, electronic materials and the like. Although no fusion occurs when C(B)/(C(B)+C(C)+C(N)) or C(N)/(C(B)+C(C)+C(N)) is 0.05 or lower, the amount of boron nitride on the surface will be reduced, making it impossible to sufficiently cover the surfaces of the carbonaceous particles or carbonaceous fibers and thus making it difficult to ensure the chemical stability of the surface. Conversely, when C(B)/(C(B)+C(C)+C(N)) or C(N)/(C(B) +C(C)+C(N)) is 0.3 or greater, the surfaces of the carbonaceous particles or carbonaceous fibers will be chemically stabilized by effective coverage of boron nitride on the surfaces of the carbonaceous particles or carbonaceous fibers, but considerable fusion will occur between the carbonaceous particles or carbonaceous fibers after heat treatment. When the carbonaceous particles or carbonaceous fibers are used as sliding materials, reinforcing materials or electronic materials, it is highly possible that the original performance of the carbonaceous particles or carbonaceous fibers will be impaired.

Incidentally, it is believed that the main reason why the atomic concentration of carbon is not zero in the surface region as measured by photoelectron spectroscopy, even though the surfaces of the carbonaceous particles or carbonaceous fibers of the invention are covered with the boron nitride film, is that the low thickness of the boron nitride thin film covering the surface results in simultaneous measurement of the carbon in the substrate. This phenomenon has long been known to occur in photoelectron spectroscopic measurements, and therefore in the case of light element materials such as those of the invention, it is assumed that measurement by photoelectron spectroscopy will usually be to a depth of about a few nm from the uppermost surface.

The surfaces of the carbonaceous particles or carbonaceous fibers of the invention are covered with a boron nitride thin film. Consequently, the surfaces of the carbonaceous particles or carbonaceous fibers of the invention can be rendered chemically stable without hindering the original excellent performance of the carbonaceous particles or carbonaceous fibers, such as high lubricating performance, a high elastic modulus per unit weight, high strength per unit weight, etc. In other words, with conventional carbonaceous particles and carbonaceous fibers, the surface carbon readily reacts with oxygen and other oxidative gases and metals or other matrices at high temperatures of at least several hundred ° C., so that their expected performance cannot be exhibited when they are used as sliding materials, reinforcing materials and the like; in contrast, the carbonaceous particles and carbonaceous fibers of the invention are resistant to reaction with oxygen and other oxidative gases and metals or other matrices even at high temperatures of several hundred ° C. and higher, and therefore exhibit their expected high performance when used as sliding materials, reinforcing materials, etc. In addition, since the thermal stability of boron nitride in inert gases is comparable to that of graphite, the carbonaceous particles and carbonaceous fibers of the invention have thermal stability equivalent to that of graphite in inert gases, even under high temperature environments of about 1000° C. and above.

Because the surfaces of the carbonaceous particles or carbonaceous fibers of the invention are chemically stabilized, when used as negative electrode active materials in lithium secondary batteries they are resistant to side-reactions such as decomposition of the solvent at the negative electrode surface either during or after charging. They are also able to suppress run away reactions between the negative electrode and the solvent in cases of internal or external short-circuits or extrinsic temperature increases.

It is also preferred for the carbonaceous particles and carbonaceous fibers of the invention to have a 002 plane spacing ($d_{002}$) of 0.337 nm or less as determined by X-ray diffraction which, as is already commonly known, indicates that the carbonaceous particles or carbonaceous fibers of the invention have a high degree of crystallinity, i.e. a high degree of graphitization. It is believed that the carbonaceous particles or carbonaceous fibers of the invention have such a high degree of crystallinity because, as will be explained below, production of the carbonaceous particles or carbonaceous fibers of the invention is carried out by extended heat treatment in the copresence of boron nitride, and therefore the catalytic effect of the boron increases the degree of crystallinity of the carbonaceous particles or carbonaceous fibers. Generally speaking, carbonaceous particles with a higher degree of crystallinity make superior sliding materials because of their higher mechanical anisotropy. Also, carbonaceous materials with a high crystallinity degree inherently have high strength and a high elastic modulus, and are therefore excellent reinforcers for composite materials. When the carbonaceous particles or carbonaceous fibers of the invention are used as negative electrode active materials for lithium secondary batteries, a $d_{002}$ of no greater than 0.337 nm will result in a very large the "reversible capacity", which increases their usefulness as negative electrode active materials for lithium secondary batteries.

The carbonaceous particles and carbonaceous fibers of the invention can be produced by mixing the boron compound at 1–10 wt % in terms of boron with the carbonaceous particle or carbonaceous fiber starting material, sealing the mixture in a crucible, raising the temperature of the crucible to 2500° C. or above in an atmosphere of an inert gas containing nitrogen gas at from 1 mol % to 90 mol % (preferably from 10 mol % to 90 mol %) or a reducing gas containing nitrogen gas at from 1 mol % to 90 mol % (preferably from 10 mol % to 90 mol %), and after holding it for a prescribed time, or without holding it, subsequently cooling it to 1000° C. or below at a rate of 1.0° C./min or less and letting it stand to cool.

The carbonaceous particle starting material used may be coke made from coal tar or petroleum, or natural graphite, artificial graphite, carbon black or the like. The particle size of the carbonaceous particle starting material and the distribution and particle shape may be selected as desired in conformity with the final use. The carbonaceous fiber starting material used may be pitch-based carbon fibers, PAN-based carbon fibers, vapor growth carbon fibers, etc. The carbonaceous fiber starting material may be used as short fibers or particle-like fibers (fiber-like particles), or long fibers, or even as one-dimensional bundled fibers, in two-dimensionally woven fabric form, or in any desired three-dimensional shape, in order to suit the final use.

There are no particular restrictions on the boron compound which is added, and it may be metallic boron, boron carbide, boron oxide, boric acid, boron nitride or the like. The added boron compound may be of a single type or a mixture of two or more types. The added boron compound may also be a compound for industrial use. If the boron compound is added at less than 1 wt % in terms of boron, it will be impossible to adequately cover the surfaces of the carbonaceous particles or carbonaceous fibers with the boron nitride thin film. At greater than 10 wt % in terms of boron, more fusion will occur between the carbonaceous particles or carbonaceous fibers, resulting in possible impairment in the original performance of the carbonaceous particles or carbonaceous fibers.

The carbonaceous particles or carbonaceous fibers are sealed in a crucible in an atmosphere of an inert gas containing nitrogen gas at from 1 mol % to 90 mol % or a reducing gas containing nitrogen gas at from 1 mol% to 90 mol %, and subjected to heat treatment, because this is necessary to stably produce a boron nitride thin film on the surfaces of the carbonaceous particles or carbonaceous fibers. Gases components except for nitrogen which may be used in the atmosphere gas include, for example, helium, argon and other rare gases, carbon monoxide and other reducing gases, and mixtures thereof. If the nitrogen gas concentration in the atmosphere gas is higher than 90 mol % the rate of boron nitride production will be too high, thus reducing its adhesion with the substrate. If the nitrogen gas concentration in the atmosphere gas is lower than 1 mol % it will not be possible to adequately cover the surfaces of the carbonaceous particles or carbonaceous fibers with the boron nitride. The nitrogen gas concentration is preferably at least 10 mol %.

When heat treatment is carried out in an open system, the boron nitride formed on the surfaces of the carbonaceous particles or carbonaceous fibers vaporizes due to the high temperature and readily escapes to the outside, making it difficult to stably form a boron nitride film on the surfaces of the carbonaceous particles or carbonaceous fibers. For heat treatment in a closed system (it does not have to be a totally closed system, but free flow of boron nitride and other vapor must be prevented to maintain a substantially higher vapor concentration inside the system than outside the system), a crucible is provided which is made of tungsten or graphite and can satisfactorily maintain a closed (sealed) state with a screw-fixed lid, and the boron compound as the starting material for treatment is held in the crucible with the lid closed.

Heat treatment with temperature increase to a high temperature of 2500° C. or above is necessary to achieve a high degree of crystallinity for the carbonaceous particle or carbonaceous fibers.

By first raising the temperature to 2500° C. or above and then holding it for a prescribed time or without holding it, and subsequently cooling to 1000° C. or below at a rate of 1.0° C./min or less, it is possible to form a uniform boron nitride thin film on the surfaces of the carbonaceous particles or carbonaceous fibers and to improve the adhesion between the boron nitride thin film and the substrate. If the temperature is raised to 2500° C. or above and then held for a prescribed time or without holding, and is subsequently cooled to 1000° C. or below at a rate of greater than 1.0° C./min, there will be insufficient time for formation of boron nitride and therefore the boron nitride thin film formed on the surfaces of the carbonaceous particles or carbonaceous fibers will be non-uniform and the adhesion between the boron nitride thin film and the substrate will be inadequate.

Although the mechanism by which the carbonaceous particles or carbonaceous fibers of the invention can be produced by the process described above is not fully understood, it is surmised to be as follows. First, holding the carbonaceous starting material at a high temperature of 2500° C. or above crystallizes the carbonaceous starting material, and crystallization is accelerated by the presence of the boron compound. The boron compound basically decomposed through this process. Next, gradual cooling from the high temperature produces a negative pressure inside the crucible, and although the crucible is closed (sealed), nitrogen-containing gas slowly seeps into the crucible through gaps at the screw section. The nitrogen in the atmosphere gas which seeps in reacts with the boron which has diffused from the interior of the carbonaceous particles or carbonaceous fibers out to their surfaces, producing boron nitride on the surfaces. The reaction reduces the partial pressure of nitrogen gas in the crucible. This sufficiently lowers the boron nitride formation rate, adequately achieve the thermal relaxation and maintain satisfactory adhesion with the substrate. A slower temperature lowering rate also produces a sufficient boron nitride film over an extended period, so that boron nitride can uniformly cover the surfaces of the carbonaceous particles or carbonaceous fibers. Also, while this is not a limitation, the boron is essentially provided only from the interior of the carbonaceous particles or carbonaceous fibers, and therefore the film thickness of the resulting boron nitride film is low and uniform.

The lithium secondary battery according to the invention can be identical to any publicly known lithium secondary battery, except that the aforementioned carbonaceous particles or fibers covered on the surface with boron nitride are used as the negative electrode active material.

The lithium secondary battery basically employs a lithium ion-containing nonaqueous electrolyte, a reversible charge/discharge material as the positive electrode active material, a separator which is permeable to the nonaqueous electrolyte and to lithium ions, and the boron nitride-covered carbonaceous particles or fibers as the negative electrode active material.

The method for constructing the negative electrode using the carbonaceous particles or fibers of the invention may be any common method. One example is a method whereby an appropriate amount of a binder is used to form a film of uniform thickness on the metal foil serving as the collector.

The electrolyte solution may be a solution of a lithium salt such as lithium perchlorate, lithium borofluoride, lithium hexafluoroantimonate, etc. dissolved in an organic solvent preferably which is aprotic and have a large permittivity, such as propylene carbonate, ethylene carbonate, tetrahydrofuran or the like.

The positive electrode material used may be a lithium metal oxide of chromium oxide, titanium oxide, cobalt oxide, vanadium pentoxide, etc., a metal chalcogen compound such as titanium sulfide, or a conductive conjugated polymer compound, such as polyacetylene, etc. If necessary, an appropriate amount of a conduction aid such as carbon black as well as a suitable amount of a binder may be added to the positive electrode material, which is used to form a film of uniform thickness on the metal foil collector and used as the positive electrode.

The separator may be a nonwoven fabric, woven fabric, porous film or the like.

The lithium secondary battery may also comprise a collector, gasket, sealing plate, case, etc.

The exterior shape of the lithium secondary battery may be cylindrical, polygonal, button-shaped or any other desired shape. It may also be of the type commonly known as solid-state batteries or polymer batteries which employ solid electrolytes instead of electrolyte solutions.

FIG. 1 shows a button-shaped lithium secondary battery. In FIG. 1, 1 is a negative electrode made of a boron nitride-covered carbonaceous material according to the invention, 2 is a case, 3 is a separator, 4 is a positive electrode, 5 is a gasket and 6 is a sealing plate. This battery production example is referred to in the examples which follow.

The structural parameters and measuring methods used for evaluation of the carbonaceous particles and carbonaceous fibers of the invention were as follows.

(1) $d_{002}$

A monochromatic X-ray beam was collimated into a parallel beam and irradiated onto the carbonaceous particles to which high purity silicon had been added as an internal reference, and the peak corresponding to the 002 plane of graphite was measured. The peak position was precisely calculated based on the internal reference silicon peak, and that position was used to calculate the spacing $d_{002}$ between layers. This evaluation method is described in detail in, for example, "Carbon Fibers", Kindai Henshusha, publ. March 1986, p733–p742.

(2) Element concentration in carbonaceous samples surface region determined by photoelectron spectroscopy The carbonaceous samples were affixed to a sample stage under high vacuum and irradiated with monochromatic X-rays (X-rays emitted by irradiation of 8 keV electron beam onto an Al target), the number of inner shell electrons of each element which have gotten out to the vacuum was measured, and by multiplying this by the sensitivity coefficient of each element the atom concentration of each element in the carbonaceous samples surface region was determined. Only the elements boron, carbon and nitrogen were measured for the carbonaceous samples of the invention, and their atom concentrations were normalized so that the three added to a value of 1.

EXAMPLES

Examples and comparative examples of the invention will now be described. These examples and comparative examples serve merely as illustrations of the invention and are not intended to limit its scope.

Example 1

Pitch coke powder obtained from coal tar pitch was pulverized using a ball mill, and the portion with a grain size of 50 µm and less was separated out with a sieve. To this there was added boron nitride at 5.0 wt % in terms of boron, and the components were thoroughly mixed.

The mixture was loaded into a cylindrical graphite crucible, and the lid was sealed shut with a screw. The sealed crucible was set in an electric furnace, and after first evacuating the interior of the electric furnace (Although the crucible was sealed, air could penetrate through gaps and therefore the interior of the crucible was also evacuated at this time.), an argon gas atmosphere containing 50 mol % nitrogen gas was supplied, the temperature was raised to about 2800° C. at a temperature elevating rate of about 12°

C./min in the atmosphere and this temperature was sustained for one hour, after which the temperature was gradually reduced to 1000° C. at a temperature lowering rate of about 0.5° C./min, and the mixture was then allowed to cool to room temperature.

The carbonaceous powder obtained in this manner exhibited virtually no fusion.

The $d_{002}$ of the carbon powder taken out from the cylindrical graphite container was measured according to the method described above based on X-ray diffraction, resulting in a high degree of graphitization as evidenced by $d_{002}$=0.3356 nm.

Also, the atomic concentration of boron C(B), atomic concentration of carbon C(C) and atomic concentration of nitrogen C(N) on the surface of the carbonaceous powder were measured by the method described above based on photoelectron spectroscopy, and the results were C(B)=0.24, C(C)=0.54 and C(N)=0.21, indicating that the carbon powder surface had been covered with boron nitride (BN) to a suitable thickness. The total of the three different atom concentrations is not a value of 1 simply due to rounding off of the values.

Example 2

A bundle was made from 3000 carbon fibers obtained from coal pitch and having a tensile modulus of 47 tonf/mm², a tensile strength of 325 kgf/mm² and a mean fiber diameter of about 8 μm, and the carbon fiber bundle was woven into a two-dimensional carbon fiber sheet. The sheet was evenly sprinkled with boron oxide at 2.0 wt % in terms of boron and then sprayed with an ethanol spray to attach the boron oxide to the sheet. The sheet was then curled into a cylindrical form to make a compact shape, and the ethanol was removed by evaporation.

The sheet was loaded into a cylindrical graphite crucible, and the lid was sealed shut with a screw. The sealed crucible was set in an electric furnace, and after first evacuating the interior of the electric furnace, an argon gas atmosphere containing 10 mol % nitrogen gas was supplied, the temperature was raised to about 2600° C. at a temperature elevating rate of about 10° C./min in the atmosphere and this temperature was sustained for about one hour, after which the temperature was gradually reduced to 1000° C. at a temperature lowering rate of about 0.8° C./min, and the mixture was then allowed to cool to room temperature.

The two-dimensional sheet prepared from the carbonaceous fibers obtained in this manner exhibited virtually no fusion between the fibers.

The $d_{002}$ of the two-dimensional sheet taken out from the cylindrical graphite container was measured according to the method described above based on X-ray diffraction, resulting in a high degree of graphitization as evidenced by $d_{002}$=0.3359 nm.

Also, the atomic concentration of boron C(B), atomic concentration of carbon C(C) and atomic concentration of nitrogen C(N) on the surface of the carbon powder were measured in the same manner as Example 1, and the results were C(B)=0.11, C(C)=0.77 and C(N)=0.12, indicating that the surface of the two-dimensional sheet made of carbonaceous fibers had been covered with boron nitride (BN) to a suitable thickness.

Comparative Example 1

In the same manner as Example 1, pitch coke powder obtained from coal tar pitch was pulverized using a ball mill, and the portion with a grain size of 50 μm and less was separated out with a sieve. To this there was added metallic boron at 3.0 wt %, and the components were thoroughly mixed.

The mixture was loaded into a cylindrical graphite crucible, and the lid was sealed shut with a screw. The sealed crucible was set in an electric furnace, and after first evacuating the interior of the electric furnace, an argon gas atmosphere containing 50 mol % nitrogen gas was supplied, the temperature was raised to about 2200° C. at a temperature elevating rate of about 12° C./min in the atmosphere and this temperature was sustained for about one hour, after which the temperature was gradually reduced to 1000° C. at a temperature lowering rate of about 0.5° C./min, and the mixture was then allowed to cool to room temperature.

The carbonaceous powder obtained in this manner exhibited virtually no fusion.

The $d_{002}$ of the carbon powder taken out from the cylindrical graphite container was measured according to the method described above based on X-ray diffraction, resulting in a low degree of graphitization as evidenced by $d_{002}$=0.3395 nm.

Also, the atomic concentration of boron C(B), atomic concentration of carbon C(C) and atomic concentration of nitrogen C(N) on the surface of the carbonaceous powder were measured by the method described above based on photoelectron spectroscopy, and the results were C(B)=0.03, C(C)=0.93 and C(N=0.03, indicating that the carbon powder surface had not been covered with boron nitride (BN) to a suitable thickness. The total of the three different atom concentrations is not a value of 1 simply due to rounding off of the values.

Comparative Example 2

In the same manner as Example 2, a bundle was made from 3000 carbon fibers obtained from coal pitch and having a tensile modulus of 47 tonf/mm², a tensile strength of 325 kgf/mm² and a mean fiber diameter of about 8 μm, and the carbon fiber bundle was woven into a two-dimensional carbon fiber sheet. The sheet was evenly sprinkled with boron nitride at 3.0 wt % in terms of nitrogen and then sprayed with an ethanol spray to attach the boron nitride to the sheet. The sheet was then curled into a cylindrical form to make a compact shape, and the ethanol was removed by evaporation.

The sheet was loaded into a cylindrical graphite crucible as an open system without a sealed lid. The crucible was set in an electric furnace, and after first evacuating the interior of the electric furnace, an argon gas atmosphere containing 50 mol % nitrogen gas was supplied, the temperature was raised to about 2900° C. at a temperature elevating rate of about 10° C./min in the atmosphere and this temperature was sustained for about one hour, after which the temperature was gradually reduced to 1000° C. at a temperature lowering rate of about 0.1° C./min, and the mixture was then allowed to cool to room temperature.

The two-dimensional sheet prepared from the carbonaceous fibers obtained in this manner exhibited virtually no fusion between the fibers.

The $d_{002}$ of the two-dimensional sheet taken out from the cylindrical graphite container was measured according to the method described above based on X-ray diffraction, resulting in a high degree of graphitization as evidenced by $d_{002}$=0.3358 nm.

Also, the atomic concentration of boron C(B), atomic concentration of carbon C(C) and atomic concentration of nitrogen C(N) on the surface of the carbon powder were measured in the same manner as Example 1, and the results were C(B)=0.04, C(C)=0.92 and C(N)=0.04, indicating that the surface of the two-dimensional sheet made of carbonaceous fibers had not been covered with boron nitride (BN) to a suitable thickness.

Example 3

Evaluation of the carbonaceous powder obtained in Example 1 as a negative electrode material for a lithium secondary battery revealed a very high discharge capacity of 342 mA/g, which is attributed to the small $d_{002}$ (high graphitization degree). The initial efficiency was very high at 90.5%.

The performance of the negative electrode material (discharge capacity, initial efficiency) was evaluated in the following manner.

Teflon (polytetrafluoroethylene) was added at 5 wt % to the carbonaceous powder to be tested, isopropyl alcohol was used for kneading, and a sheet was prepared to a thickness of about 0.1 mm. A 10.5 mg square piece was cut out from the sheet (of which the weight of the carbonaceous powder with the Teflon excluded and to be tested was 10 mg), and it was press bonded with a nickel metal mesh collector to prepare a negative electrode for a lithium secondary battery.

Lithium metal was used for the counter electrode and reference electrode in the battery used to evaluate the negative electrode properties. The electrolyte solution used was a 1 mol/l solution of $LiPF_6$ in a mixture of ethylene carbonate and diethyl carbonate (1:1 of volume ratio).

With this battery construction, charging and discharging are accomplished using a constant current of 0.5 mA/cm$^2$ with a negative electrode potential in the range of 0 V to 1.0 V. The negative electrode potential is the value at the potential reference of the metal lithium reference electrode. The discharge capacity is the charge strength which can be discharged after charging. According to the invention, charge/discharged is repeated 5 times, and the average of the 5 discharge capacity values is defined as the discharge capacity. The initial efficiency is the ratio of the discharge capacity to the discharge capacity for the first charge/discharge after the negative electrode is fabricated.

Example 4

A coin-shaped lithium secondary battery was fabricated and its performance evaluated in the following manner.

Polyvinylidene fluoride powder was added as a binder at 5 wt % to the carbonaceous powder obtained in Example 1, and a slurry was prepared by mixing these in N-methylpyrrolidone as the solvent, after which the solution was uniformly applied onto a copper foil to a thickness of about 0.1 mm and dried to fabricate a negative electrode electrode material, and a negative electrode electrode was formed from the sheet by cutting out a disk with a diameter of about 16 mmφ. For the positive electrode, $LiCoO_2$ prepared from lithium carbonate and cobalt carbonate was used, polyvinylidene fluoride powder was added to the powder at 5 wt %, ketchen black was added at 5 wt %, a slurry was prepared by mixing in N-methylpyrrolidone, and the solution was evenly applied onto an aluminum foil and dried to fabricate an electrode sheet. A positive electrode electrode was formed from the sheet by cutting out a disk with a diameter of about 16 mmφ. A coin-shaped lithium secondary battery was fabricated using the positive electrode electrode and negative electrode electrode, a solution of $LiBF_4$ a mixture of ethylene carbonate and dimethyl carbonate (1:1 of volume ratio) at a concentration of 1 mol/l as the electrolyte, and a polypropylene nonwoven fabric as the separator.

The storage characteristics were evaluated by normalizing the coin-shaped lithium secondary battery with 5 repeated charge/discharge cycles, and then fully charging it and allowing it to stand as an open circuit for 20 days at a temperature of 60° C., subsequently discharging it, and determining the discharge capacity.

As a result, 98% of the discharge capacity was retained even after standing at 60° C. for 20 days, demonstrating that the side-reactions on the surface had been inhibited due to the boron nitride covering the surface of the carbonaceous powder of the invention.

Example 5

Figure 2:
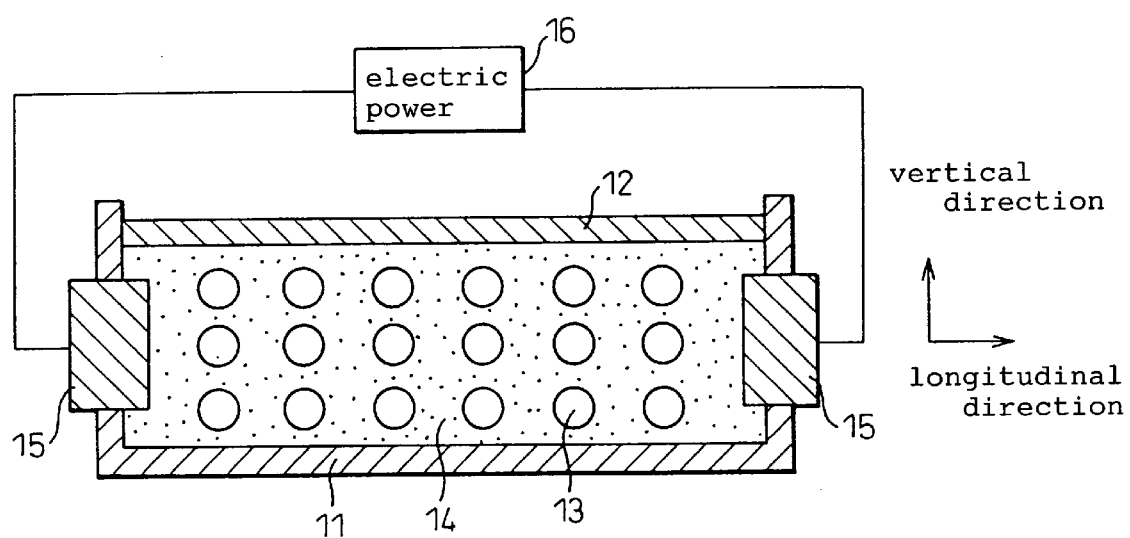
FIG. 2 is a cross-sectional view of the Atchison furnace used in the examples.

FIG. 2 is a vertical cross-sectional sketch of an Atchison furnace. Cylindrical graphite crucibles 13 were evenly packed horizontally (although vertically is also acceptable), using coke beads 14 as the packing powder, in an Atchison furnace 11 with side walls made of a heat insulating material composed of silica sand and coke powder, and this was closed with a cap 12 made of the same heat insulating material. Upon application of a current to the furnace using a power source 16 through electrodes 15 provided on each side of the furnace, the high electrical resistance of the coke powder produced heat at these sections, thus heating the crucibles 13 and the products inside them.

Pitch coke powder obtained from coal tar pitch was pulverized using an impeller mill, and the portion with a grain size of 50 μm and less was separated out with a sieve. To this there was added metallic boron at 4.0 wt % in terms of boron, and the components were thoroughly mixed.

The mixture was loaded into each cylindrical graphite crucible, the lid was sealed shut with a screw, and heat treatment was carried out in an Atchison furnace. First, the graphite crucibles were set in the Atchison furnace, and the Atchison furnace was packed with coke beads so as to bury the graphite crucibles. At about 40 hours after initiating electrification the temperature was raised to 2900° C., after which the temperature was gradually lowered to near 1000° C. at a cooling rate of about 0.3° C./min. After standing for cooling to a temperature of about 300° C. as the temperature for taking out the graphite crucibles, each of the graphite crucibles was taken out.

Since this heat treatment was effected in a high temperature range of about 1000° C. or above (the temperature range at which boron and nitrogen react to produce boron nitride), in which the atmosphere gas consisted substantially of nitrogen from the air and carbon monoxide produced by reaction between oxygen in the air and the coke beads, the nitrogen gas concentration was approximately 60%.

The carbonaceous powder obtained in this manner exhibited virtually no fusion.

The $d_{002}$ of the carbon powder taken out from the cylindrical graphite container was measured according to the method described above based on X-ray diffraction, resulting in a high degree of graphitization as evidenced by $d_{002}$=0.3357 nm.

Also, the atomic concentration of boron C(B), atomic concentration of carbon C(C) and atomic concentration of nitrogen C(N) on the surface of the carbonaceous powder were measured by the method described above based on photoelectron spectroscopy, and the results were C(B)=0.26, C(C)=0.50 and C(N)=0.25, indicating that the carbon powder surface had been covered with boron nitride (BN) to a suitable thickness. The total of the three different atom concentrations is not a value of 1 simply due to rounding off of the values.

INDUSTRIAL APPLICABILITY

The carbonaceous particles and carbonaceous fibers of the present invention have a high degree of graphitization and are uniquely covered on their surfaces with boron nitride thin films, and are therefore chemically stabilized. They can therefore be used for a wider range of applications, such as electronic materials including negative electrode active materials for lithium secondary batteries, as well as sliding materials and reinforcers for composite materials.

What is claimed is:

1. Boron nitride-coated carbonaceous particles characterized in that the surface of the carbonaceous particles are coated with a boron nitride thin film, wherein the atomic concentration of boron C(B), the atomic concentration of carbon C(C) and the atomic concentration of nitrogen C(N) satisfy the following inequalities:

$$0.05 < C(B)/(C(B)+C(C)+C(N)) < 0.3$$

$$0.05 < C(N)/(C(B)+C(C)+C(N)) < 0.3$$

in the surface region as measured by photoelectron spectroscopy.

2. Carbonaceous particles according to claim 1, wherein the 002 plane spacing ($d_{002}$) as determined by X-ray diffraction is 0.337 nm or less.

3. Boron nitride-coated carbonaceous fibers characterized in that the surface of the carbonaceous fibers are coated with a boron nitride thin film, wherein the atomic concentration of boron C(B), the atomic concentration of carbon C(C) and the atomic concentration of nitrogen C(N) satisfy the following inequalities.

$$0.05 < C(B)/(C(B)+C(C)+C(N)) < 0.3$$

$$0.05 < C(N)/(C(B)+C(C)+C(N)) < 0.3$$

in the surface region as measured by photoelectron spectroscopy.

4. Carbonaceous fibers according to claim 3, wherein the 002 plane spacing ($d_{002}$) as determined by x-ray diffraction is 0.337 nm or less.

* * * * *